(12) United States Patent
Aoyagi

(10) Patent No.: US 9,256,979 B2
(45) Date of Patent: Feb. 9, 2016

(54) STORAGE MEDIUM HAVING STORED THEREON IMAGE DISPLAY PROGRAM, IMAGE DISPLAY SYSTEM, IMAGE DISPLAY METHOD, AND IMAGE DISPLAY APPARATUS

(75) Inventor: Norihiro Aoyagi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 783 days.

(21) Appl. No.: 12/856,855

(22) Filed: Aug. 16, 2010

(65) Prior Publication Data

US 2011/0248999 A1    Oct. 13, 2011

(30) Foreign Application Priority Data

Apr. 12, 2010   (JP) .................................. 2010-091421

(51) Int. Cl.
*G06T 15/50*   (2011.01)
*G06T 15/60*   (2006.01)
*G06T 15/04*   (2011.01)

(52) U.S. Cl.
CPC .................. *G06T 15/60* (2013.01); *G06T 15/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,252,608 | B1 * | 6/2001 | Snyder et al. | 345/473 |
| 6,876,362 | B1 * | 4/2005 | Newhall et al. | 345/426 |
| 2002/0022517 | A1 * | 2/2002 | Tokuyama et al. | 463/32 |

FOREIGN PATENT DOCUMENTS

| | | |
|---|---|---|
| JP | 2005-100109 | 4/2005 |
| JP | 2007-141082 | 6/2007 |

OTHER PUBLICATIONS

Tobias Isenberg, Bert Freudenberg, Nick Halper, Stefan Schlechtweg and Thomas Strothotte, A developer',s guide to silhouette algorithms for polygonal models. IEEE Computer Graphics and Applications, 23 (4): 28&ndash,37, 2003.*
"Nintendo Official Guidebook, the Legend of Zelda: The Wind Waker", edited by Nintendo, Inc., $1^{st}$ edition, published by Shogakukan, Inc., Mar. 1, 2003, p. 146 (see, at least, paragraphs [0002] and [0003] of Applicant's specification for a concise explanation of the relevance of this reference).

* cited by examiner

*Primary Examiner* — Stephen R Koziol
*Assistant Examiner* — Robert Craddock
(74) *Attorney, Agent, or Firm* — Nixon & Vanderhye, P.C.

(57) ABSTRACT

A computer-readable storage medium has stored thereon an program that is executed in a display apparatus that takes an image of a virtual three-dimensional space in which a first object and a second object are present, by a virtual camera and renders the virtual three-dimensional space. The program allows the apparatus to generate a silhouette image for representing a silhouette of the first object, in which silhouette image, gradation information changes in accordance with a distance from the second object to each part of the first object; to generate an image of the second object that is seen from the virtual camera; and to synthesize the silhouette image on the image of the second object that is seen from the virtual camera, such that the silhouette image is darker at a portion thereof corresponding to a part of the first object closer to the second object.

20 Claims, 12 Drawing Sheets

F I G. 5
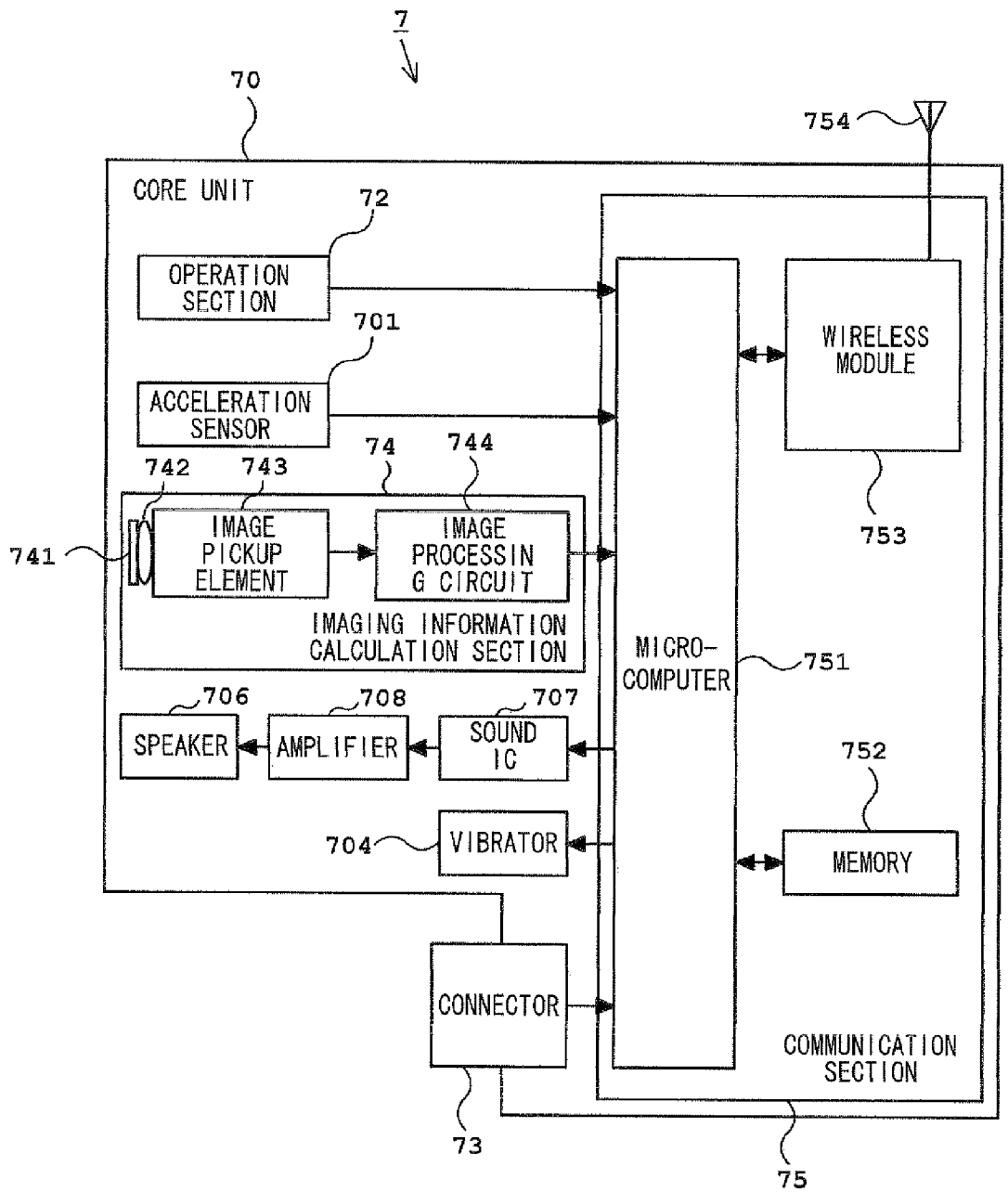

STORAGE MEDIUM HAVING STORED THEREON IMAGE DISPLAY PROGRAM, IMAGE DISPLAY SYSTEM, IMAGE DISPLAY METHOD, AND IMAGE DISPLAY APPARATUS

CROSS REFERENCE TO RELATED APPLICATION

The disclosure of Japanese Patent Application No. 2010-091421, filed on Apr. 12, 2010, is incorporated herein by reference.

BACKGROUND OF THE INVENTION

1. Field of the Invention

The present invention relates to an image display program, an image display system, an image display method, and an image display apparatus. More specifically, the present invention relates to a storage medium having stored thereon an image display program, an image display system, an image display method, and an image display apparatus, which display an object that is present in a virtual three-dimensional space.

2. Description of the Background Art

An apparatus that displays a virtual space is required to perform calculation on the basis of many parameters, in order to more realistically display behavior of an object. For example, "Nintendo Official Guidebook, The Legend of Zelda: The Wind Waker", edited by Nintendo, Inc., 1st edition, published by Shogakukan, Inc., Mar. 1, 2003, p 146 (hereinafter, referred to as Non-Patent Document 1) shows one example of a game executed by such a game apparatus that displays a virtual space. In the game, realistic expression is achieved by rendering a view, which is represented in the virtual space and seen through a curtain, on the basis of various parameters such as light emitted from a light source that is located in the virtual space.

In many examples including Non-Patent Document 1, rendering is performed on the basis of various parameters such as light emitted from a light source that is located in a virtual space. Recently, increased performance of computers or graphic chips allows more calculations for realistic rendering on the basis of various parameters as described above. Nonetheless, such calculations remain complicated and accompanied with high processing load, causing not little effect on other processing.

SUMMARY OF THE INVENTION

Therefore, an object of the present invention is to enable rendering a virtual three-dimensional space, which contains a plurality of objects, at a relatively low processing load while achieving realistic expression.

The present invention has the following features to attain the object mentioned above.

One aspect of the present invention provides an image display program that is executed by a computer of an image display apparatus that takes an image of a virtual three-dimensional space in which a first object and a second object are present, by a virtual camera and renders the virtual three-dimensional space. The image display program causes the computer to operate as: silhouette image generation means for generating a silhouette image for representing a silhouette; second object rendering means; and synthesis means for synthesizing the silhouette image on an image of the second object.

Here, the silhouette image generation means generates a silhouette image for representing a silhouette of the first object when the first object overlaps at least a part of the second object present on a near side of the first object when seen from the virtual camera.

Further, the silhouette image generation means generates a silhouette image in which gradation information changes in accordance with a distance from the second object to each part of the first object. The second rendering means generates an image of the second object that is seen from the virtual camera. The synthesis means synthesizes the silhouette image on the image of the second object that is seen from the virtual camera, such that the silhouette image is darker at a portion thereof corresponding to a part of the first object closer to the second object.

In one embodiment, the silhouette image generation means generates the silhouette image by performing mapping of a texture in which a gradation changes in tone in accordance with a distance from the second object, to the first object.

In other embodiments, the silhouette image generation means generates the silhouette image by projection texture mapping.

In another embodiment, the texture is a texture in which a gradation gradually changes from black to white.

In still another embodiment, the silhouette image generation means generates the silhouette image on the basis of depth information of the first object that is seen from a second object side.

In still another embodiment, the synthesis means synthesizes the silhouette image on the image of the second object that is seen from the virtual camera, by mixing, in accordance with the silhouette image, a color of the image of the second object and a certain color for representing the silhouette of the first object.

In still another embodiment, the silhouette image generation means generates a silhouette image in which a color is darker at a portion thereof corresponding to a part of the first object closer to the second object.

In still another embodiment, the synthesis means synthesizes the silhouette image on the image of the second object that is seen from the virtual camera, by alternately displaying the image of the second object and the silhouette image at intervals of a predetermined number of pixels.

In still another embodiment, the image display program further causes the computer to operate as first object rendering means for overwriting an image of a portion of the first object that is not hidden by the second object when seen from the virtual camera, at a position, in an image after synthesis by the synthesis means, corresponding to the portion.

In still another embodiment, the second object rendering means generates the image of the second object while generating depth information from the virtual camera. The synthesis means synthesizes the silhouette image on the image of the second object without updating the depth information generated by the second object rendering means. Moreover, the first object rendering means includes non-hidden portion determination means for determining, on the basis of the depth information, a portion of the first object that is not hidden by the second object. Here, on the basis of a determination result of the non-hidden portion determination means, the first object rendering means overwrites an image of the portion of the first object that is not hidden by the second object, at a position, in the image after synthesis by the synthesis means, corresponding to the portion.

In still another embodiment, the image display program further causes the computer to operate as update means for updating a position or a posture of the first object in the virtual three-dimensional space. The following processes are repeatedly executed as a series of processes. In other words, the updating process by the update means, the generating process by the silhouette image generation means, the generating process by the second object rendering means, the synthesizing process by the synthesis means, and the overwriting process by the first object rendering means, are repeatedly executed.

Further, the above-described image display program may be used in an image display apparatus executing the program, or in an image display system in which one or more apparatuses are configured to be connected by communications to one another. Moreover, the present invention also includes an image display method that can be implemented as a storage medium having stored the above-described program thereon; an apparatus; or a system.

As used herein, the term "system" (e.g., an image display system, an information processing system, a game system) is intended to include not only one apparatus but also a plurality of apparatuses each of which is able to communicate with any of the other apparatuses.

According to the present invention, a virtual three-dimensional space containing a plurality of objects can be rendered at a relatively low processing load while realistic expression is achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an block diagram showing an exemplary configuration of the core unit 70 of FIG. 3;

FIG. 7B shows an example of a result of: performing projection mapping to the object J1 using a template texture having a gradation in a constant direction; and rendering the object J1 in a frame buffer 34a;

FIG. 8 shows an example of an image indicating the object J2, which has been written into the frame buffer 34a;

DESCRIPTION OF THE PREFERRED EMBODIMENTS (Fundamental Configuration of Image Display System)

Figure 1:
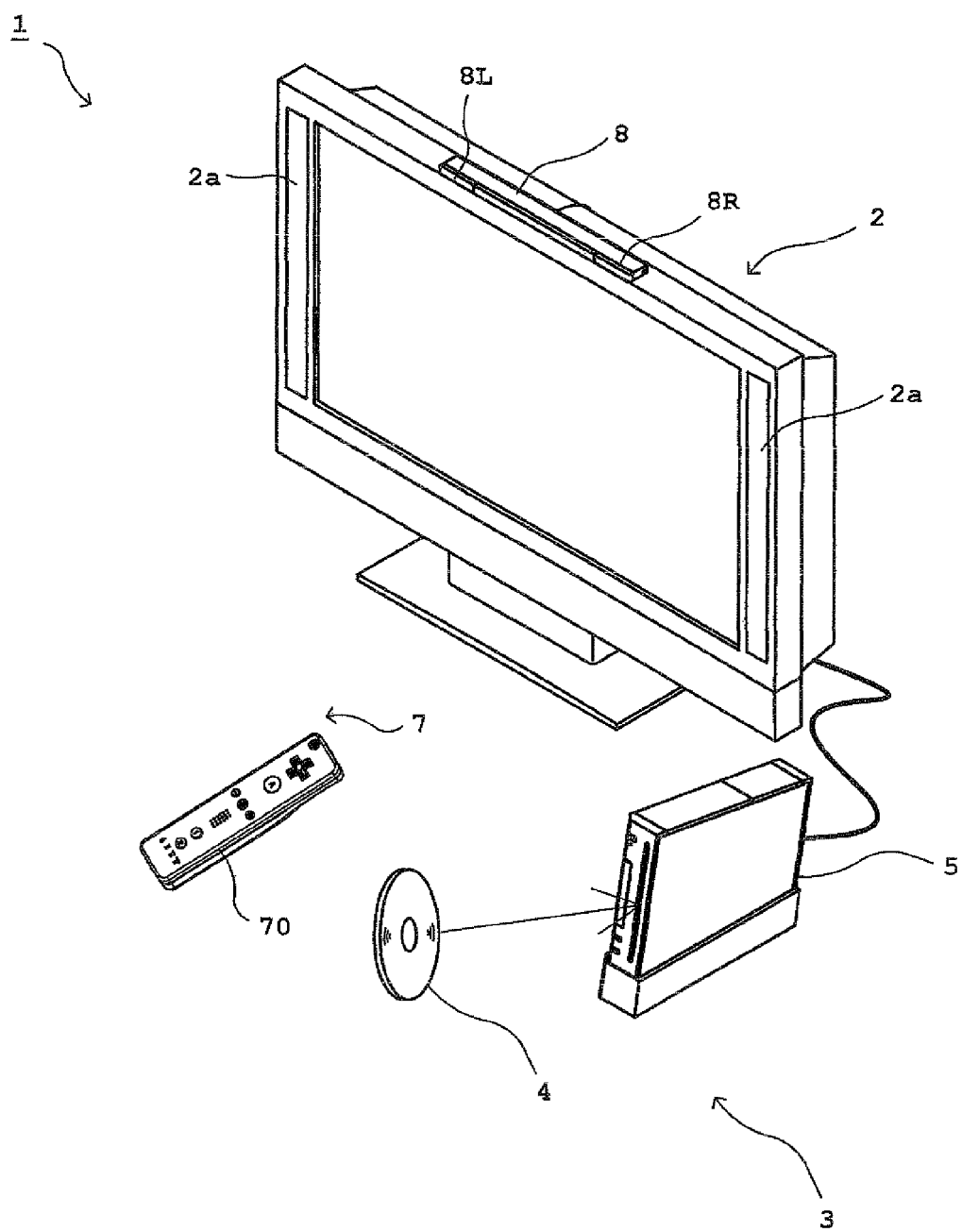
FIG. 1 is an external view showing a game system 1 according to an embodiment of the present invention.

With reference to FIG. 1, the following will describe an image display system according to an embodiment of the present invention. Hereinafter, in order to give a specific description, a description will be given using, as the image display system, a game system 1 including a stationary game apparatus body 5.

Figure 2:
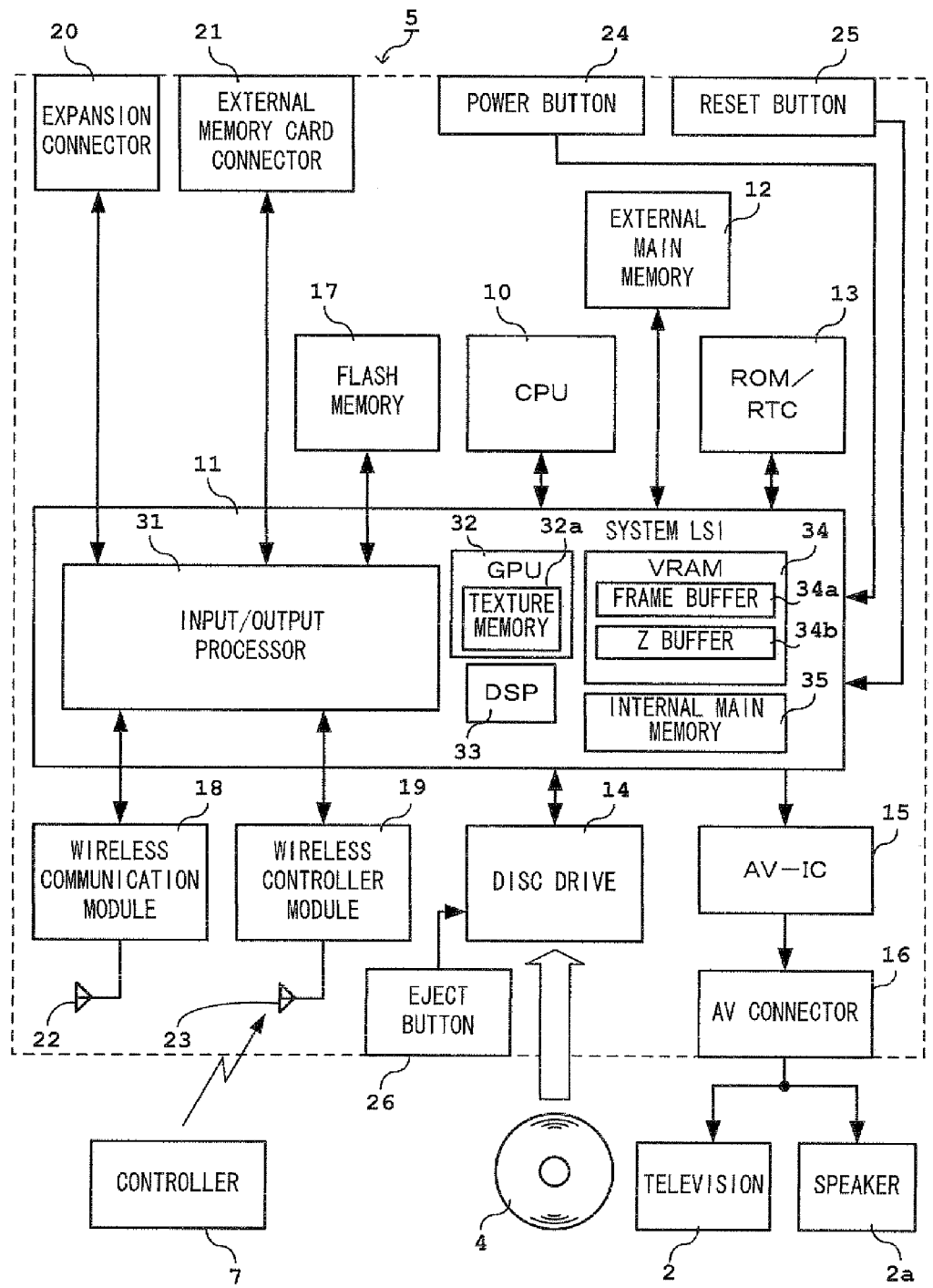
FIG. 2 is a block diagram showing an example of a game apparatus body 5 of FIG. 1.

FIG. 1 is an external view showing an example of the game system 1 including a stationary game apparatus 3. FIG. 2 is a block diagram showing an example of the game apparatus body 5. The game system 1 will be described below. The drawings appended hereto are intended to illustrate the illustrative embodiment of the present invention and not to limit the scope of the present invention to the specific embodiment illustrated therein.

Note that, in the following description, programs, data, and the like, which are designated by reference numerals of D10 to D51, are sometimes described, and these reference numerals (in a memory map) indicate a relation with a storage area of the game apparatus body 5 shown in later-described FIG. 13.

As shown in FIG. 1, the game system 1 includes: a home-use TV receiver 2 (hereinafter, referred to as a monitor 2) which is an example of display means; and the stationary game apparatus 3 connected to the monitor 2 via a connection cord. The monitor 2 has loudspeakers 2a for outputting, in the form of sound, an audio signal outputted from the game apparatus 3.

The game apparatus 3 includes: an optical disc 4 having stored thereon programs (e.g., a later-described program D11 and a later-described game application D12) and various data; the game apparatus body 5 having a computer for executing the programs of the optical disc 4 to cause the monitor 2 to output and display a game screen; and a controller 7 for providing the game apparatus body 5 with necessary operation information for a game in which a character or the like displayed in the game screen is controlled.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected by wireless communication. Further, the optical disc 4 as an example of an exchangeable information storage medium is detachably mounted on the game apparatus body 5.

On the game apparatus body 5, a flash memory 17 (see FIG. 2) is mounted, the flash memory 17 acting as a backup memory for fixedly storing such data as saved data. The game apparatus body 5 executes the programs stored in the optical disc 4, and displays a result thereof as a game image on the monitor 2. The programs to be executed may be previously stored not only in the optical disc 4, but also in the flash memory 17. The game apparatus body 5 can reproduce a state of the game played in the past, by using the saved data stored in the flash memory 17, and display a game image of the reproduced state on the monitor 2. A user of the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information, to the game apparatus body 5 having the wireless controller module 19 therein.

The controller 7 include a core unit 70. The core unit 70 is operation means mainly for controlling an object or the like displayed on a display screen of the monitor 2

The core unit 70 includes a housing, which is small enough to be held by one hand, and a plurality of operation buttons (including a cross key, a stick or the like) exposed at a surface of the housing. As described later in detail, the core unit 70 includes an imaging information calculation section 74 for taking an image of a view seen from the core unit 70. As an example of imaging targets of the imaging information calculation section 74, two LED modules 8L and 8R (hereinafter, referred to as "markers 8L and 8R") are provided in the vicinity of the display screen of the monitor 2. These markers 8L and 8R each output, for example, infrared light forward from the monitor 2.

The controller 7 (e.g., the core unit 70) is capable of receiving, via a communication section 75, transmission data wirelessly transmitted from the wireless controller module 19 of the game apparatus body 5, and generating a sound or vibration based on the transmission data.

(Internal Configuration of Game Apparatus Body)

The following will describe an internal configuration of the game apparatus body 5, with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs information processing on the basis of the programs stored in the optical disc 4.

The CPU 10 is connected to the system LSI 11. In addition to the CPU 10, the external main memory 12, the ROM/RTC 13, the disc drive 14 and the AV-IC 15 are connected to the system LSI 11. The system LSI 11 performs processing such as: controlling data transfer among the components connected to the system LSI 11; generating an image to be displayed; obtaining data from external devices; and the like. An internal configuration of the system LSI 11 will be described later. The external main memory 12 that is a volatile memory stores programs and various data loaded from the optical disc 4, or various data loaded from the flash memory 17. The external main memory 12 is used as a work area or buffer area of the CPU 10. The ROM/RTC 13 has a ROM in which a boot program for the game apparatus body 5 is incorporated (so-called a boot ROM), and has a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means in the game apparatus body 5, and generates an image in accordance with a graphics command (image generation command) from the CPU 10. Specifically, the GPU 32 generates game image data by, according to the graphics command, performing: calculation processing required for displaying 3D graphics, such as processing of coordinate transformation from a 3D coordinate to a 2D coordinate, which is preprocessing of rendering; and final rendering processing such as texture mapping (processing of synthesizing a color of a polygon and a color of a texture per pixel and outputting a resultant color per pixel).

More specifically, describing rasterization as an example of the functions of the GPU 32, when data per vertex (per polygon) subjected to processing such as so-called perspective transformation processing is obtained, the GPU 32 calculates each side of triangles that constitute a polygon, from the vertexes of the triangles (included in the data) ("triangle setup"), and performs processing of filling the insides of the calculated triangles (processing as a DDA (Digital Differential Analyzer)). A color obtained by interpolating color information that each vertex of the triangles has, is used for filling the insides of the triangles.

Further, the GPU 32 also serves as a rasterizer to select, for each pixel where the triangle is filled, a corresponding pixel (also referred to as texel) of an image that indicates a design. For example, when data of vertexes constituting the polygon includes information of a position to be cut out from a texture image, the GPU 32 scans the texture image on the basis of the information of the position, and calculates position information of a pixel of the texture image corresponding to each pixel to be filled.

The VRAM 34 stores necessary data (data such as polygon data, texture data, and the like) for the GPU 32 to execute the graphics command. The VRAM 34 includes a frame buffer 34a and a Z buffer 34b.

The frame buffer 34a is, for example, a memory for rendering or storing image data, for one frame, which is to be supplied to the monitor 2. When the later-described AV-IC 15 reads data in the frame buffer 34a at a predetermined cycle (e.g., a cycle of 1/60 sec), a three-dimensional game image is displayed on the screen of the monitor 2.

Further, the Z buffer 34b has a storage capacity corresponding to (the number of pixels (storage locations or addresses) corresponding to the frame buffer 34a)×(the bit count of depth data per pixel), and stores depth information or depth data (Z value) of a dot corresponding to each storage location in the frame buffer 34a.

The DSP 33 acts as an audio processor, and generates audio data by using sound data and sound waveform (tone) data stored in the internal main memory 35 and in the external main memory 12.

Further, similarly to the external main memory 12, the internal main memory 35 stores programs and various data and is also used as a work area or buffer area of the CPU 10.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the input/output processor 31 transmits the data to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. The CPU 10 is able to read and use the data stored in the flash memory 17. In addition to the data transmitted and received between the game apparatus body 5 and other game apparatuses or various servers, the flash memory 17 may store saved data of a game that is played using the game apparatus body 5 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or of the external main memory 12.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with the network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data in or from the external storage medium.

On the game apparatus body 5 (e.g., on a front main surface thereof), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like are provided. The power button 24 and the reset button 25 are connected to the system LSI 11. When the power button 24 is turned on, each component of the game apparatus body 5 is supplied with power via an AC adaptor that is not shown. When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

(Fundamental Configuration of Core Unit)

Figure 3:
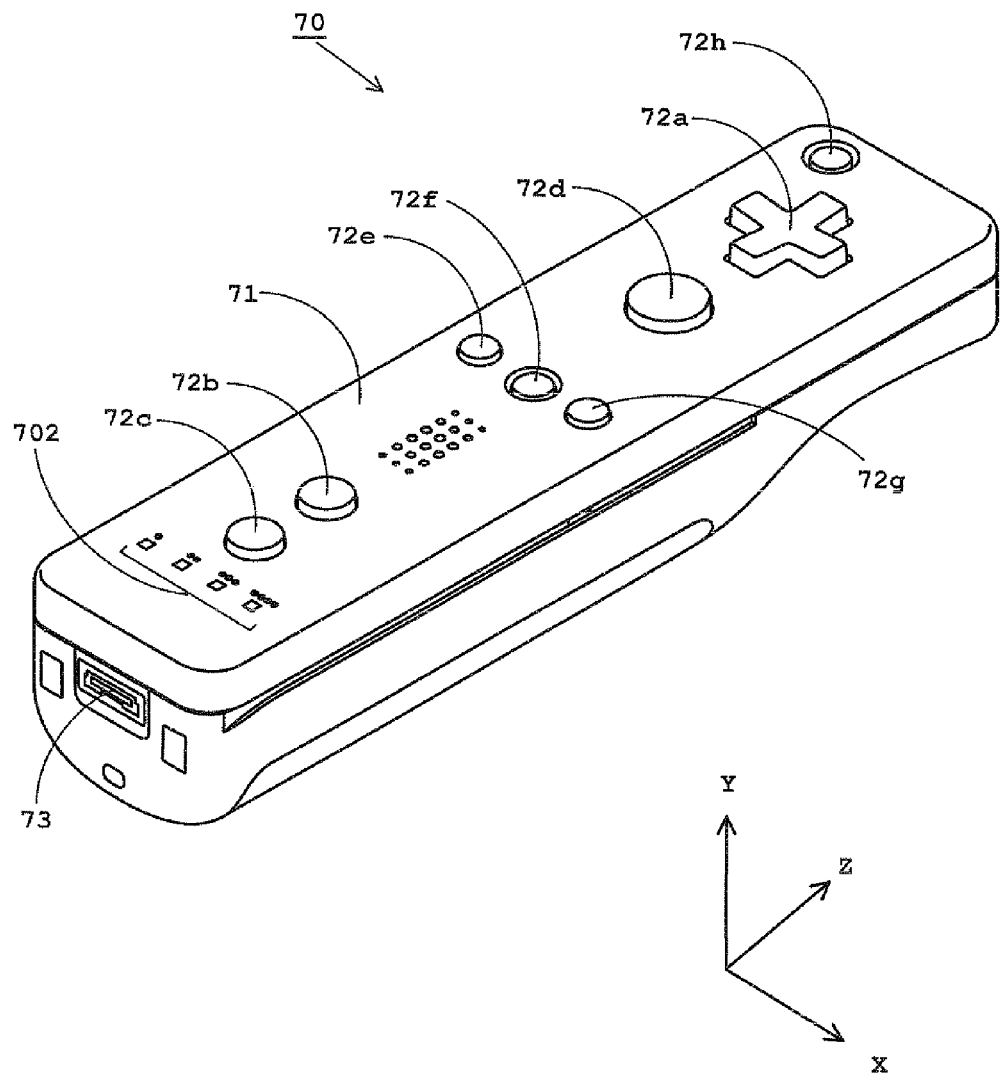
FIG. 3 is an isometric view of a core unit 70 of FIG. 1 seen from a top rear side thereof.
Figure 4:
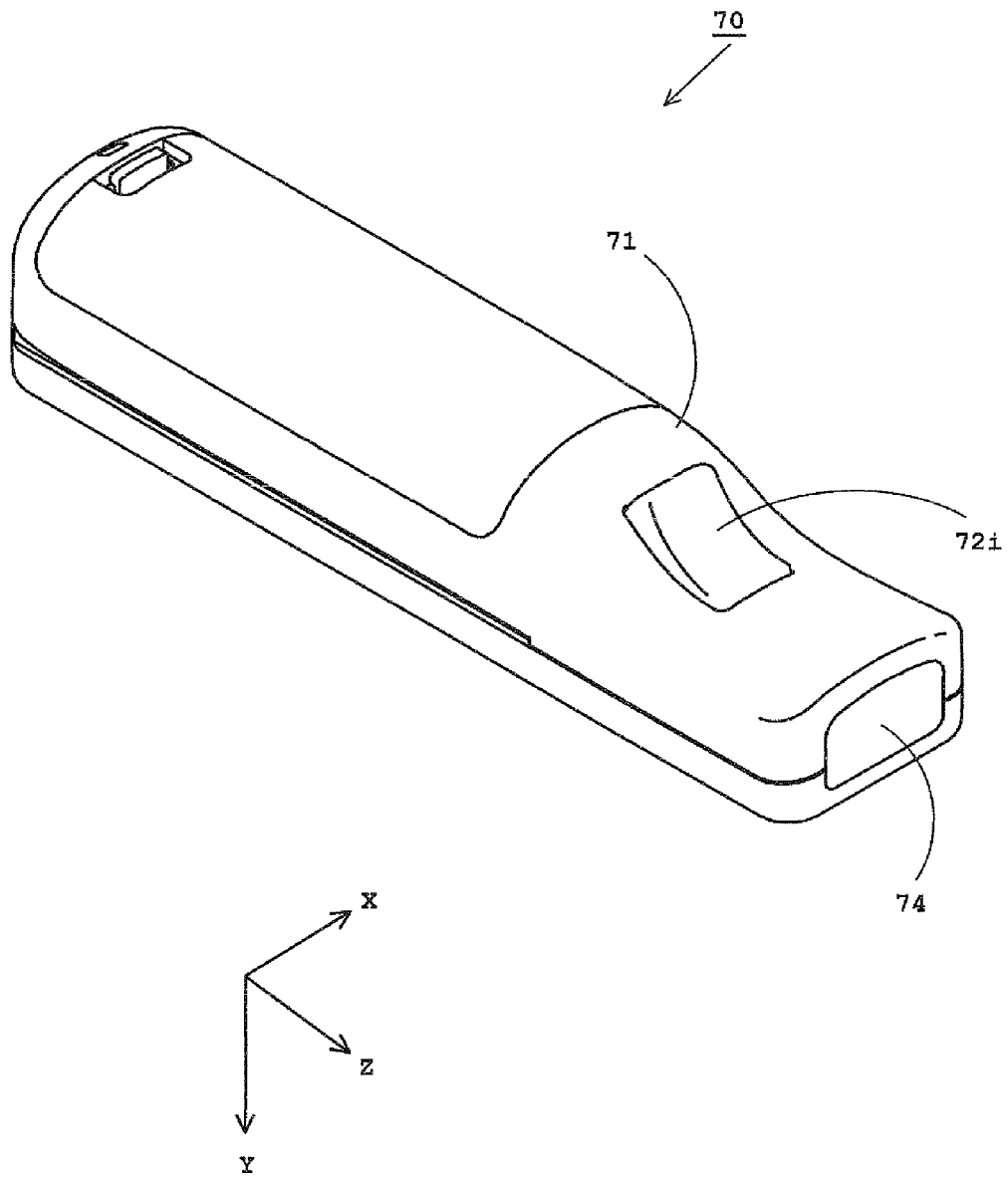
FIG. 4 is an isometric view of the core unit 70 of FIG. 3 seen from a bottom front side thereof.

With reference to FIGS. 3 and 4, the core unit 70 will be described. FIG. 3 is an isometric view of the core unit 70 seen from a top rear side thereof. FIG. 4 is an isometric view of the core unit 70 seen from a bottom front side thereof.

As shown in FIGS. 3 and 4, the core unit 70 includes a housing 71 formed by plastic molding or the like. The housing 71 has a plurality of operation sections 72 provided thereon. The housing 71 has a substantially parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right, and left), which are respectively located on cross-shaped projecting portions arranged at intervals of 90 degrees. A user selects one of the front, rear, right, and left directions by pressing one of the operation portions of the cross key 72a. Through an operation of the cross key 72a, the user can, for example, designate a direction in which a player character or the like appearing in a virtual game world is to move, or give an instruction to select one of a plurality of options.

The cross key 72a is an operation section for outputting an operation signal in accordance with the above-described direction input operation performed by the user. Such an operation section may be provided in a different form. For example, an operation section, which has four push switches arranged in a cross formation and which is capable of outputting an operation signal in accordance with pressing of one of the push switches by the user, may be provided. Alternatively, an operation section, which has a composite switch having, in addition to the above four push switches, a center switch provided at an intersection point of the above cross formation, may be provided. Still alternatively, the cross key 72a may be replaced with an operation section which includes an inclinable stick (so-called a joy stick) projecting from the top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the user presses a head thereof, outputting a corresponding operation signal. For example, functions as a 1st button, a 2nd button, and an A button are assigned to the operation buttons 72b to 72d. Also, functions as a minus button, a home button, and a plus button are assigned to the operation buttons 72e to 72g. The operation functions are assigned to the respective operation buttons 72a to 72g in accordance with the programs executed by the game apparatus body 5. In the exemplary arrangement shown in FIG. 3, the operation buttons 72b to 72d are arranged in a line at the center on the top surface of the housing 71 in a front-rear direction. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the user.

In front of the cross key 72a on the top surface of the housing 71, an operation button 72h is provided. The operation button 72h is a power switch for turning on or off the game apparatus body 5 by remote control. The operation button 72h also has a top surface buried in the top surface of the housing 71, so as not to be inadvertently pressed by the user.

Behind the operation button 72c on the top surface of the housing 71, a plurality of LEDs 702 are provided. Here, a controller type (a number) is assigned to the core unit 70 such that the core unit 70 is distinguishable from other controllers. The LEDs 702 are used for, e.g., informing the user of the controller type currently set for the core unit 70. Specifically, a signal is transmitted from the wireless controller module 19 to the core unit 70 such that one of the plurality of LEDs 702, which corresponds to the controller type of the core unit 70, is lit up.

On the top surface of the housing 71, sound holes for outputting sounds from a later-described speaker to the external space are formed between the operation button 72b and the operation buttons 72e to 72g.

On the bottom surface of the housing 71, a recessed portion is formed. The recessed portion on the bottom surface of the housing 71 is formed in a position in which an index finger or middle finger of the user is located when the user holds the core unit 70 with one hand so as to point a front surface thereof to the markers 8L and 8R. On a slope surface of the recessed portion, an operation button 72i is provided. The operation button 72i is an operation section acting as, for example, a B button.

On the front surface of the housing 71, an image pickup element 743 that is a part of the imaging information calculation section 74 is provided. The imaging information calculation section 74 is a system for: analyzing image data of an image taken by the core unit 70; identifying an area having a high brightness in the image; and detecting a position of the center of gravity, the size, and the like of the area. The imaging information calculation section 74 has, for example, a maximum sampling period of approximately 200 frames/sec, and therefore can trace and analyze even a relatively fast motion of the core unit 70. The configuration of the imaging information calculation section 74 will be described later in detail. On the rear surface of the housing 71, a connector 73 is provided. The connector 73 is, for example, an edge connector, and is used for engaging and connecting the core unit 70 with a connection cable, for example.

In order to give a specific description below, a coordinate system set with respect to the core unit 70 will be defined. As shown in FIGS. 3 and 4, an X-axis, a Y-axis and a Z-axis, which are perpendicular to one another, are defined with respect to the core unit 70. Specifically, the longitudinal direction of the housing 71, which is the front-rear direction of the core unit 70, is defined as the Z-axis, and a direction along the Z-axis toward the front surface (a surface on which the imaging information calculation section 74 is provided) of the core unit 70 is a Z-axis positive direction. The up-down direction of the core unit 70 is defined as the Y-axis, and a direction along the Y-axis toward the top surface (a surface on which the operation button 72a is provided) of the housing 71 is defined as a Y-axis positive direction. The left-right direction of the core unit 70 is defined as the X-axis, and a direction along the X-axis toward the right side surface (a side surface shown in FIG. 3) of the housing 71 is defined as an X-axis positive direction.

(Internal Configuration of Controller)

With reference to FIG. 5, the following will describe an internal configuration of the controller 7. FIG. 5 is a block diagram showing an example of the internal configuration of the controller 7.

As shown in FIG. 5, the core unit 70 includes the communication section 75 in addition to the above-described operation sections 72, the imaging information calculation section 74, the acceleration sensor 701, the vibrator 704, the speaker 706, the sound IC 707, and the amplifier 708.

The imaging Information calculation section 74 includes an infrared filter 741, a lens 742, the image pickup element 743, and an image processing circuit 744. The infrared filter 741 allows, among lights incident thereon through the front surface of the core unit 70, only infrared light to pass therethrough. The lens 742 condenses the infrared light having passed through the infrared filter 741, and outputs the condensed infrared light to the image pickup element 743. The image pickup element 743 is a solid-state image pickup element such as a CMOS sensor, CCD or the like. The image pickup element 743 takes an image of the infrared light condensed by the lens 742.

In other words, the image pickup element 743 takes an image of only the infrared light having passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, and detects a high brightness area of the image, and outputs, to the communication section 75, process result data indicating the results of the detection, for example, position coordinates, a square measure of the high brightness area. The imaging information calculation section 74 is fixed to the housing 71 of the core unit 70. The imaging direction of the imaging information calculation section 74 can be changed by changing the facing direction of the housing 71.

Preferably, the core unit 70 includes a triaxial (X-axis, Y-axis, and Z-axis) acceleration sensor 701. The triaxial acceleration sensor 701 detects linear acceleration in three directions, i.e., the up-down direction (the Y-axis shown in FIG. 3), the left-right direction (the X-axis shown in FIG. 3), and the front-rear direction (the Z-axis shown in FIG. 3). Alternatively, an accelerometer capable of detecting linear acceleration along at least one axis direction (e.g., Z-axis direction) may be used. As a non-limiting example, the acceleration sensor 701 may be of the type available from Analog Devices, Inc. or STMicroelectronics N.V. Preferably, the acceleration sensor 701 is of an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the acceleration sensor 701.

Accelerometers, as used in the acceleration sensor 701, are only capable of detecting acceleration along a straight line (linear acceleration) corresponding to each axis of the acceleration sensor 701. In other words, the direct output from the acceleration sensor 701 is limited to signals indicative of linear acceleration (static or dynamic) along each of the three axes thereof. As a result, the acceleration sensor 701 cannot directly detect movement along a non-linear (e.g., arcuate) path, rotation, rotational movement, angular displacement, position, orientation or any other physical characteristic.

However, through processing by a computer such as a processor of the game apparatus (e.g., the CPU 10) or a processor of the controller (e.g., a microcomputer 751) based on the acceleration signals outputted from the acceleration sensor 701, additional information relating to the core unit 70 can be inferred or calculated (determined), as one skilled in the art will readily understand from the description herein.

The communication section 75 includes the microcomputer 751, a memory 752, a wireless module 753, and an antenna 754. The microcomputer 751 controls the wireless module 753 that wirelessly transmits transmission data, while using the memory 752 as a storage area during processing.

The microcomputer 751 also controls operations of the sound IC 707 and the vibrator 704 in accordance with data which is transmitted from the game apparatus body 5 and received by the wireless module 753 via the antenna 754. The sound IC 707 processes sound data or the like which is transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Operation signals from the operation sections 72 provided on the core unit 70 (key data), acceleration signals from the acceleration sensor 701 with respect to the three axial directions (X-, Y-, and Z-axis direction acceleration data), and the process result data from the imaging information calculation section 74, are outputted to the microcomputer 751.

The microcomputer 751 temporarily stores the inputted data (the key data, the X-, Y-, and Z-axis direction acceleration data, and the process result data) in the memory 752 as transmission data to be transmitted to the wireless controller module 19. Here, wireless transmission from the communication section 75 to the wireless controller module 19 is performed at predetermined time intervals. Since game processing is generally performed at a cycle of ⅙₀ sec, the wireless transmission needs to be performed at a shorter cycle.

Specifically, game processing is performed at a cycle of 16.7 ms (⅙₀ sec), and a transmission interval of the communication section 75 configured using the Bluetooth technology is 5 ms. When a timing of performing transmission to the wireless controller module 19 arrives, the microcomputer 751 outputs, to the wireless module 753, the transmission data stored in the memory 752 as a series of operation information. Then, using the Bluetooth technology, the wireless module 753 radiates, from the antenna 754, a radio signal indicating the operation information by using a carrier wave of a predetermined frequency. Thus, the key data from the operation sections 72 provided on the core unit 70, the X-, Y-, and Z-axis direction acceleration data from the acceleration sensor 701, and the process result data from the imaging information calculation section 74, are transmitted from the core unit 70. The wireless controller module 19 of the game apparatus body 5 receives the radio signal, and the game apparatus body 5 demodulates or decodes the radio signal to obtain the series of operation information (the key data, the X-, Y-, and Z-axis direction acceleration data, and the process result data). In accordance with the series of obtained operation information, the CPU 10 of the game apparatus body 5 performs information processing. In the case where the communication section 75 is configured using the Bluetooth technology, the communication section 75 may have a function of receiving transmission data wirelessly transmitted from other devices.

(Outline of Image Display Processing)

With reference to FIGS. 6A to 10, the following will describe an outline of image display processing performed by the game apparatus body 5.

Note that, as described above, the drawings appended hereto are intended to illustrate the illustrative embodiment of the present invention and not to limit the scope of the present invention to the specific embodiment illustrated therein. Particularly, FIGS. 6A to 10 are expressed in achromatic color to conform with the requirements in the formalities of drawings appended to a specification, but, the colors expressed in the original images of the drawings may include hues, and their saturations may have values other than zero (0).

Figure 10:
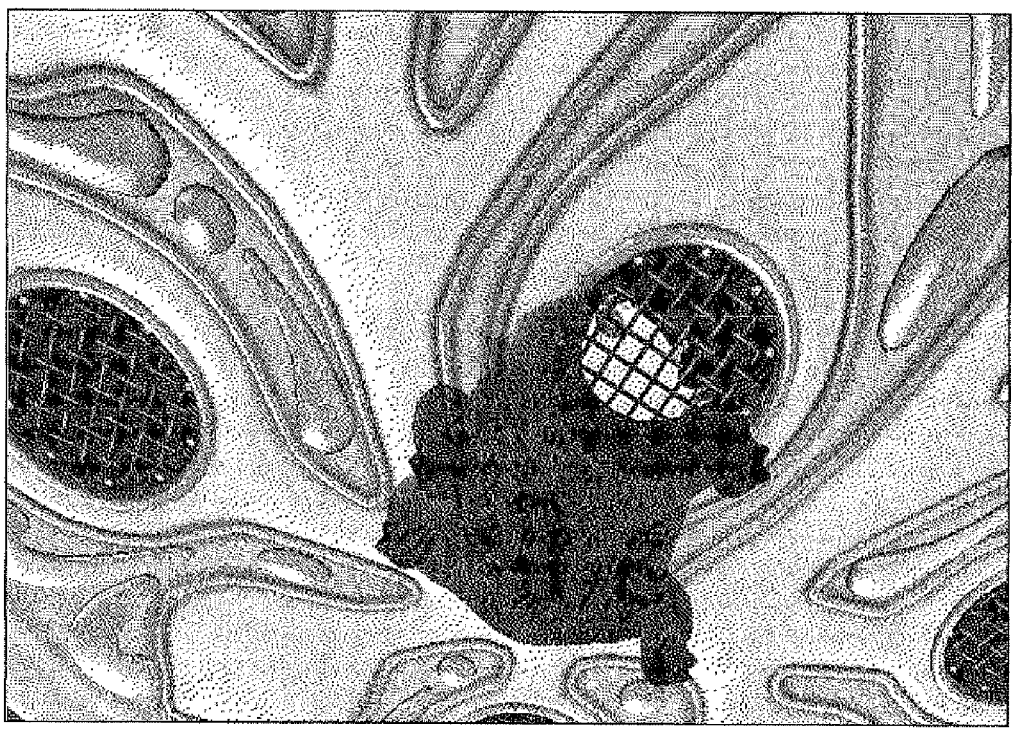
FIG. 10 shows an example of an image to which an effect is reflected that a part of the object J1 is hidden by the object J2 and silhouetted on a surface of the object J2.

In the illustrative embodiment, the game apparatus body 5 performs image display processing in accordance with the image display program D11 (see FIG. 13) read from the optical disc 4. The following will describe, as an example, a case where, in a state where sunlight is falling onto a green leaf and there is a four-legged yellow creature on the leaf, an image concerning a scene that is seen when the leaf is looked up at is generated. In this case, as shown in FIG. 10, realistic expression closer to the real is possible by: performing synthetic display (specifically, semi-transparent display) of a silhouette of the creature such that the silhouette overlaps the leaf; and shading the silhouette such that the silhouette is darker at a part of the creature closer to the leaf (in this case, at the portions of the bottoms of the feet). In the present embodiment, the image as shown in FIG. 10 can be generated at a low processing load by the image display processing, which will be now described.

Figure 6A:
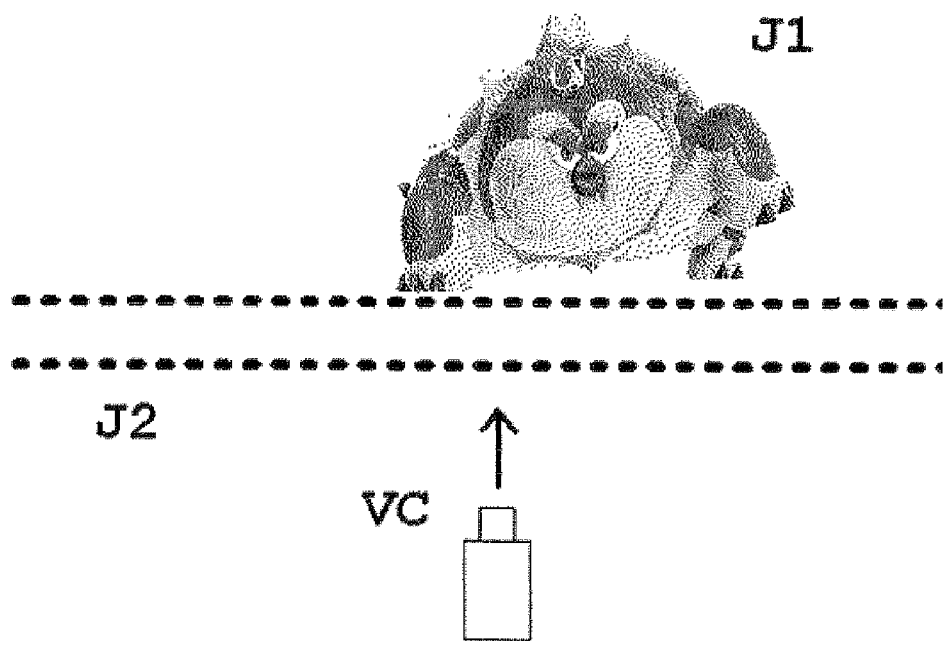
FIG. 6A schematically shows an example of the positional relation between an object that is located in a virtual three-dimensional space and a virtual camera VC that takes an image of the object.

FIG. 6A schematically shows an example of the positional relation between an object that is located in a virtual three-dimensional space and a virtual camera VC that takes an image of the object, when generating the image shown in FIG. 10.

An object J1 is a three-dimensional model representing a yellow creature that walks on four legs, and an object J2 is a three-dimensional model representing a green leaf. Specifically, the object J2 is a three-dimensional model representing a thick leaf that has an opening with a grid. Note that, in FIG. 6A, for the convenience of explanation, a part of the outline of the object 32 to be displayed is simply shown only by dotted lines.

In the illustrative embodiment, in order to eventually display an image of a scene containing a plurality of objects as shown in FIG. 10, the game apparatus body 5 performs processing by the following procedure.

First, the game apparatus body 5 sets positions and postures of the object J1 and the object J2 that are located in the virtual three-dimensional space as shown in FIG. 6A.

Then, the game apparatus body 5 generates a silhouette image D51 for representing a silhouette of the object J1 that is to be synthesized and displayed on the object J2.

Specifically, by using a texture (hereinafter, referred to as template texture) that is prepared for generating the silhouette image and to which a gradation is applied in a constant direction (that is, such that the color is darkened gradually in a predetermined direction), the game apparatus body 5 (specifically, the GPU 32) performs projection texture mapping of this texture to a shape model of the object J1, and writes the mapped model into the frame buffer 34a. Then, the game apparatus body 5 transfers gradation information of the image corresponding to the object J1, which has been written into the frame buffer 34a and to which the gradation is applied, to an alpha channel of a texture memory 32a (an auxiliary bit for data processing, which can be used by the image display program D11) to obtain the silhouette image D51. Next, the game apparatus body 5 clears the frame buffer 34a. Such processing may be achieved by a general-purpose function, as a GPU, which the GPU 32 has, on the basis of control instructions given by the image display program D11.

Note that, when rendering a plurality of objects constituted of polygons, such that the objects overlap each other, the game apparatus body 5 uses depth information (e.g., stored in the Z buffer 34b) for setting priority of rendering of polygons along the depth direction (after generation of the silhouette image D51, the game apparatus body 5 clears the frame buffer 34a and also clears the Z buffer 34b at the same time).

Here, the object J1 subjected to mapping with the template texture will be described with reference to FIGS. 6A to 7B.

Figure 7A:
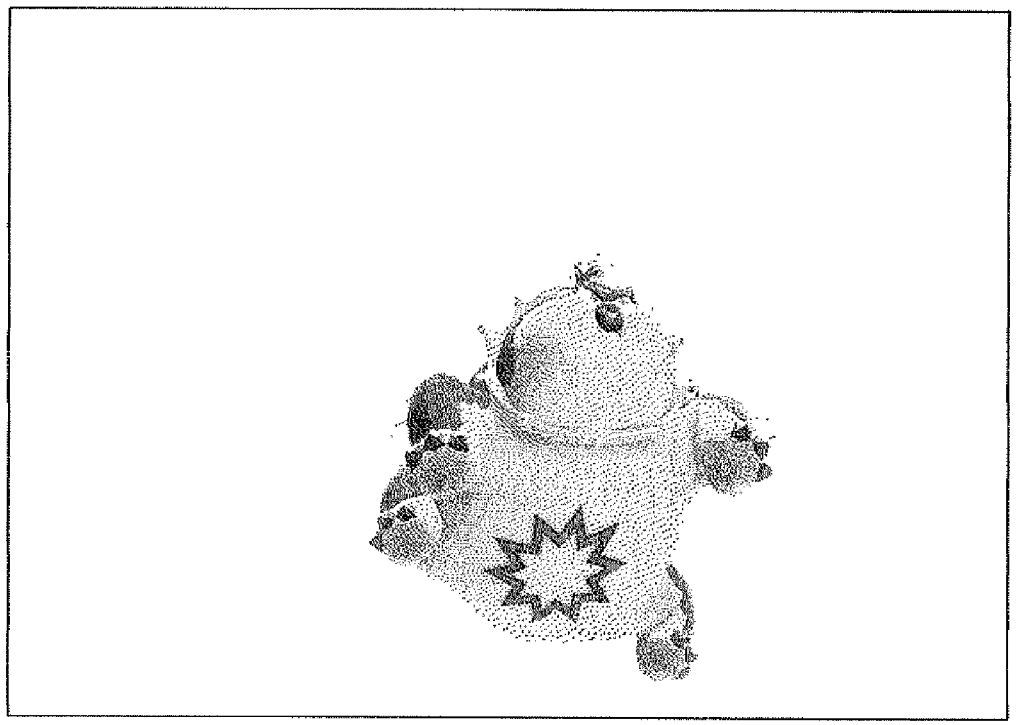
FIG. 7A is a schematic diagram showing the object J1 when an image thereof is taken from a virtual camera VC side in a state where the object J2 is not rendered.

As understood from FIG. 6A, the object J1 is located on the object J2 in the virtual three-dimensional space. FIG. 7A is a schematic diagram showing the object J1 when an image thereof is taken from the virtual camera VC side in a state where the object J2 is not rendered. As understood from this drawing, when seen from the virtual camera VC, the object J1 adopts a posture in which an abdomen thereof is exposed.

Figure 6B:
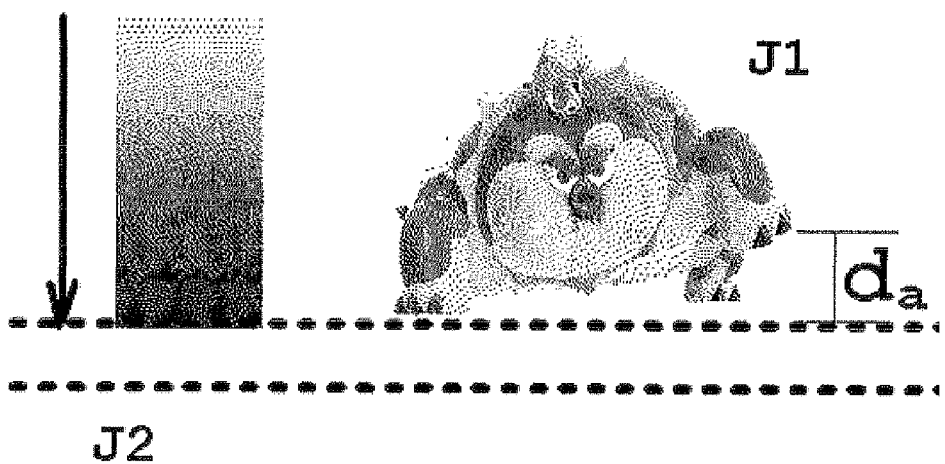
FIG. 6B is a schematic diagram for illustrating an example of the positional relation between an object J1 and an object J2; and a template texture of which projection mapping is performed to the object J1.

FIG. 6B is a schematic diagram for illustrating an example of: the positional relation between the object J1 and the object J2; and the template texture of which projection mapping is performed to the object J1.

As shown schematically on the left side of FIG. 6B, in the gradation reflected to the object J1 when projection mapping of the template texture is performed to the object J1, the color is the darkest at a position where the object J1 contacts the object J2, and is lighter at a position where the object J1 is more distant from the object J2. The game apparatus body 5 (specifically, the GPU 32) is able to perform mapping of a template texture image having a gradation (e.g., a texture that gradually changes from black to white in a constant direction) to the polygons that constitute the object J1, by associating texture coordinates defied in the projected texture image, with coordinates that define each vertex of the polygons of the object J1.

Here, in the example shown in FIG. 6B, the object J1 adopts a posture in which one of forefeet thereof (the left forefoot) is raised from the object J2 by da. When the template texture is mapped so as to achieve the gradation as described above, the forefoot (left forefoot) of the object J1 that is located at a position distant from the object J2 by da is subjected to mapping with a portion (texel) of the template texture image corresponding to a color lighter than a color of the template texture image mapped to the other forefoot (right forefoot) that contacts the object J2.

Figure 7B:
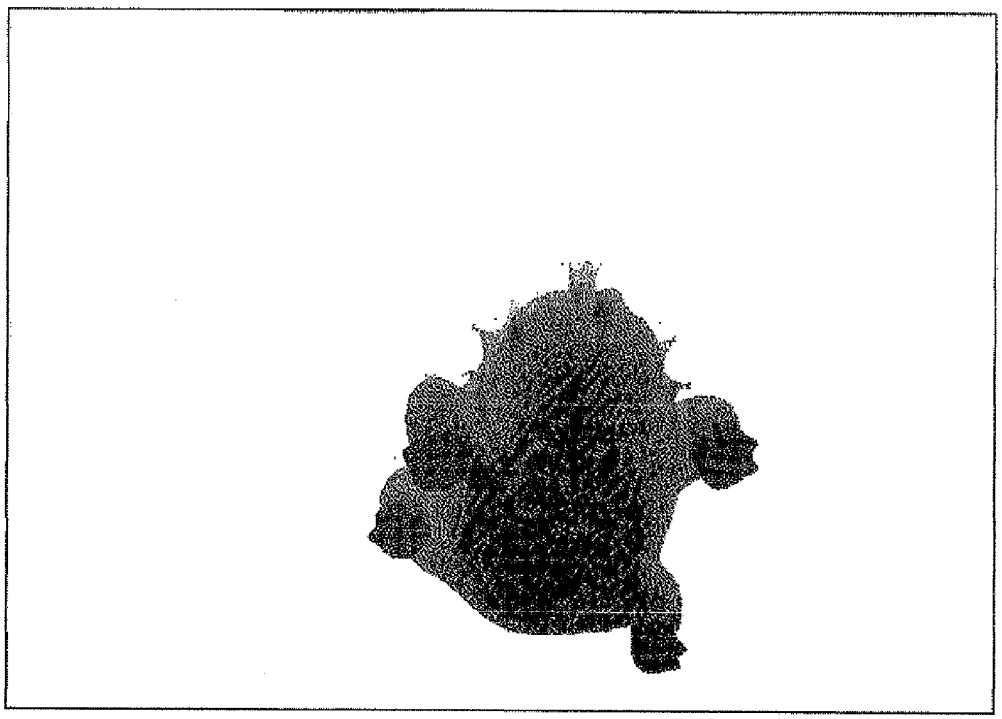

FIG. 7B shows an example of a result of performing projection mapping to the object J1 using the template texture having the gradation in the constant direction; and rendering the object 11 in the frame buffer 34a.

As understood from FIG. 7B, in the image corresponding to the object J1, which has been written into the frame buffer 34a, the color is darker at a part of the object J1 closer to the object J2 (that is, whose distance to the object J2 is shorter) (e.g., at feet contacting the object J2).

Then, the game apparatus body 5 writes gradation information written thus into the frame buffer 34a, into the alpha channel of the texture memory 32a to obtain the silhouette image D51 (alpha texture).

Figure 8:

Next, the game apparatus body 5 clears the frame buffer 34a, and then renders the object J2 in the cleared frame buffer 34a. FIG. 8 shows an example of an image indicating the object J2, which has been written into the frame buffer 34a. In this case, the game apparatus body 5 writes depth information of the object J2 into the Z buffer 34b.

Then, the game apparatus body 5 mixes a certain color (a basic color of a silhouette) with colors of the image of the object J2 at a mixture ratio corresponding to the gradation of the silhouette image D51 written into the alpha channel of the texture memory 32a. At this time, the depth information stored in the Z buffer 34b is not updated.

Figure 9:
FIG. 9 shows an example of an image of the object J2 which has been written into the frame buffer 34a by the game apparatus body 5 and on which a silhouette image of the object J1 has been synthesized.

As a result, an image of the object J2 on which the silhouette of the object J1 has been synthesized, is written into the frame buffer 34a. FIG. 9 shows an example of the image of the object J2 which has been written into the frame buffer 34a by the game apparatus body 5 and on which the silhouette image of the object J1 has been synthesized.

Then, the game apparatus body 5 is able to render, in the frame buffer 34a, an image of the object J1 that is visually recognized through the opening of the object J2, by writing the object J1 into the frame buffer 34a on the basis of the depth information of the object J2 which has been written into the Z buffer 34b. In this manner, the image as shown in FIG. 10 is obtained.

(Detailed Description of Image Display Processing)

The following will describe in detail the image display processing performed in the game system 1.

In the game apparatus body 5 of the game system 1, the CPU 10 executes the game application D12, and executes the image display program D11 in cooperation with the game application D12. The GPU 32 is a part of image display means, and generates an image in accordance with a graphics command (image generation command) from the CPU 10. The GPU 32 obtains necessary data (data such as polygon data, texture data, and the like) for executing the graphics command, from a storage area such as the VRAM 34, and generates image data using these data.

(Main Data Used in Image Display Processing)

Figure 13:
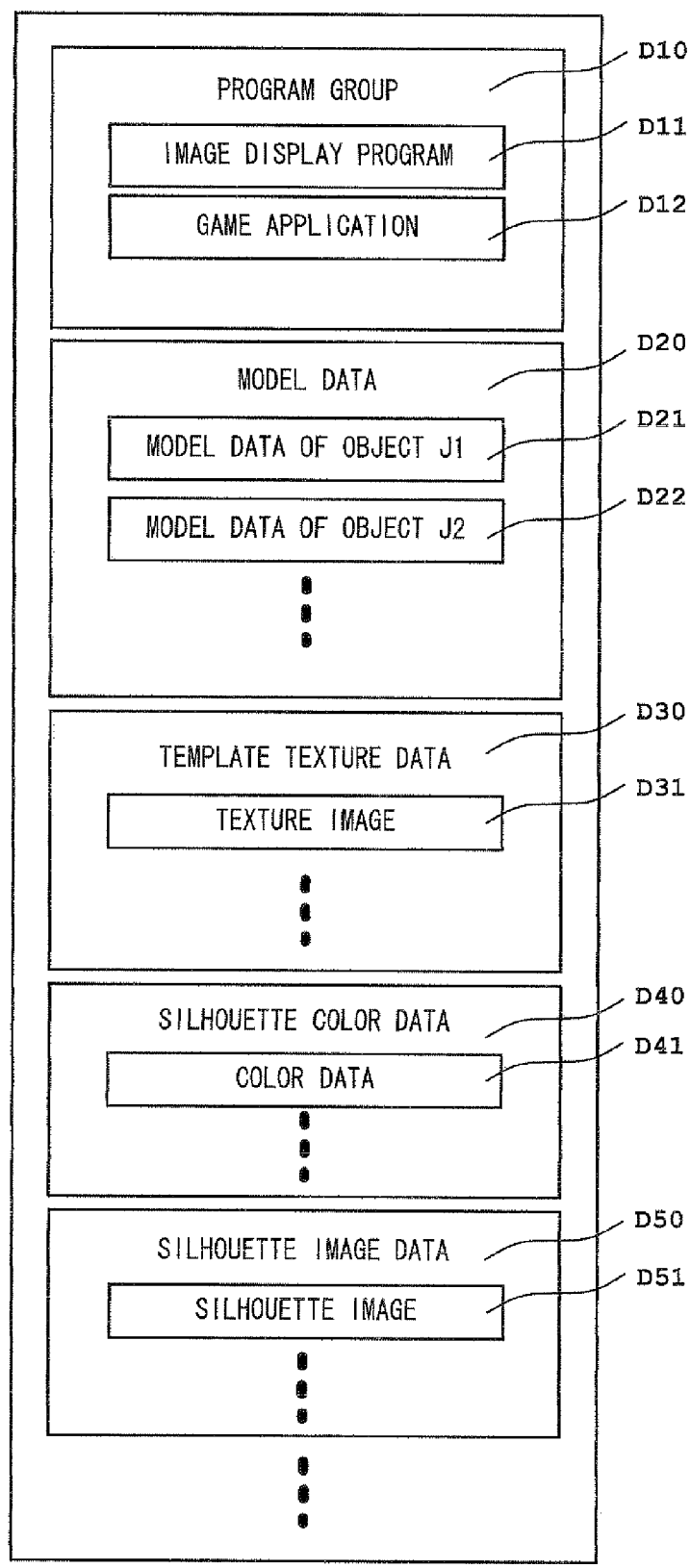
FIG. 13 shows a memory map showing main data in an image display system of the illustrative embodiment of the present invention.

FIG. 13 shows a memory map showing main data in the image display system. Various data shown in the memory map is stored in a predetermined storage area of the game apparatus body 5, such as the VRAM 34, the internal main memory 35, or the texture memory 32a. In processing of the image display program D11, necessary data is read and used at a timing when the game apparatus body 5 (the CPU 10, the GPU 32) makes a request.

A program group D10 mainly includes the following program groups.

The image display program D11 is a program group for integrating a series of processes performed in the image display system of the present embodiment. The game application D12 is an example of a game application executed in cooperation with the image display program D11.

Model data D20 is three-dimensional model data of objects to be displayed in the virtual three-dimensional space (e.g., the object J1 and the object J2). The three-dimensional model data is a set of image data for constructing multi-sided objects (polygons) and designs on surfaces thereof (texture data). The game apparatus body 5 is able to render a scene containing one or more objects in real time by generating an image using these model data.

Note that, in general, modeling of a shape of an object is defined by a "local coordinate system" for handling a shape and a deformation of each object (body), and the same applies to shape data of the object J1 and the object J2 (referred to as model data D21 and D22, respectively). In addition, data of each polygon can be stored as a list of the vertexes of triangular polygons in a storage area (vertex buffer) of the game apparatus body 5. According to need, each model data can define a texture that is mapped to a surface thereof. Data of each vertex holds position information and color information. According to need, the model data includes additional attribute information of objects to be represented in the virtual three-dimensional space.

Template texture data D30 indicates a texture image that is to be projected on an object defined by a three-dimensional shape model and to which a gradation is applied in a constant direction.

Silhouette color data D40 indicates color information (RGB) representing a basic color of a silhouette. Note that, as described above, a color of a silhouette to be actually displayed is set, for example, on the basis of: color data stored in color data D41; and the silhouette image D51 (alpha texture).

Silhouette image data D50 indicates an image that is generated by performing rendering by projection texture mapping of a template texture to a certain object.

(Specific Flow of Image Display Processing)

The following will describe a specific flow of the image display processing performed by a processor (the CPU 10 or the GPU 32) of the game apparatus body 5.

Figure 11:
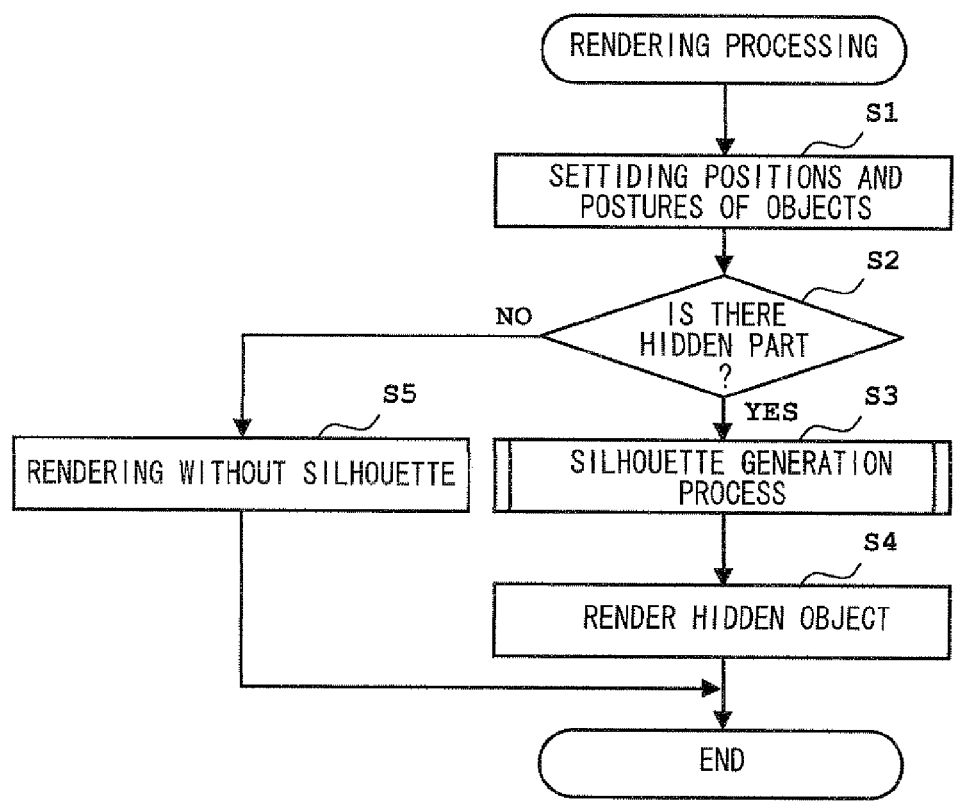
FIG. 11 is a flowchart showing an example of a series of rendering processing for rendering a scene containing a plurality of objects in the illustrative embodiment of the present invention.

With reference to FIG. 11, the flow of the image display processing performed by the processor of the game apparatus body 5 (hereinafter, referred to merely as processor) in accordance with the image display program D11, will be described. FIG. 11 is a flowchart showing an example of a series of rendering processing for rendering a scene containing a plurality of objects in the present embodiment. A series of steps shown in the flowchart is repeated typically at a cycle that is the same as a cycle at which display of the screen of the monitor 2 is updated. Note that the frequency of this repetition is adjustable, and, for example, it can be changed as appropriate according to a request from the game application D12 that cooperates with the image display program D11. In this drawing and the subsequent drawing, "step" is abbreviated as "S".

At step 1, the processor performs a process of setting positions and postures of one or more objects that are to be located in the virtual three-dimensional space. Specifically, in the present embodiment, the processor sets or updates the positions and the postures of the object J1 and the object J2, and sets or updates the position of the virtual camera VC. Note that, when there is no need to update the positions of the objects or the position of the virtual camera VC, a part of the process at this step may be omitted as appropriate.

At step 2, the processor determines whether or not a certain object hides a part or the entirety of another object when seen from the virtual camera VC, on the basis of the positions and postures of the objects that are set at step 1 (i.e., parameters for representing them), from the positional relation between the objects and the positional relation between the virtual camera VC and each object.

Typically, the processor perfectas the determination on the basis of whether or not, between the viewpoint of the virtual camera VC and a certain object of a plurality of the objects that are rendering targets, there is another object. In this case, when there is another object, there is a possibility that a part or the entirety of the certain object is hidden by the other object when seen from the virtual camera VC.

When the part or the entirety of the certain object is hidden by the other object when seen from the virtual camera VC, if there is a need to synthesize and display a silhouette of the certain object (hereinafter, referred to hidden object) on the other object (hereinafter, referred to as hiding object), the processor proceeds to a silhouette generation process at step 3 (YES at step 2). On the other hand, for example, when the certain object is not hidden by another object when seen from the virtual camera VC, the processor determines that there is no need to generate a silhouette, and proceeds to a process of rendering an object in a frame buffer without the silhouette generation process (NO at step 2).

In the illustrative embodiment, as described above, the object J1 is an object that indicates a character representing a creature that walks on four legs, while the object J2 is an object representing a thick leaf that has an opening with a grid. The object J2 is located in such a position that, while the opening of the object J2 allows an image of a part of the object J1 to be taken from the virtual camera VC side, the portion of the object J2 other than the opening hides the remaining part of the object J1 when seen from the virtual camera VC.

Note that, when the positional relation between the objects that are rendering targets is previously defined (e.g., when there is always a need to render a silhouette), the determination as to whether or not, between the viewpoint of the virtual camera VC and a certain object of a plurality of the objects that are rendering targets, there is another object, is not essential, and may be omitted.

Hereinafter, the description is continued on the assumption that a hidden object is the object J1 and a hiding object is the object J2.

At step 3, the processor performs the silhouette generation process for generating an image in which a silhouette of the certain object is synthesized and displayed on the other object that hides the part or the entirety of the certain object. An example of the silhouette generation process is a process as shown in FIG. 12.

Figure 12:
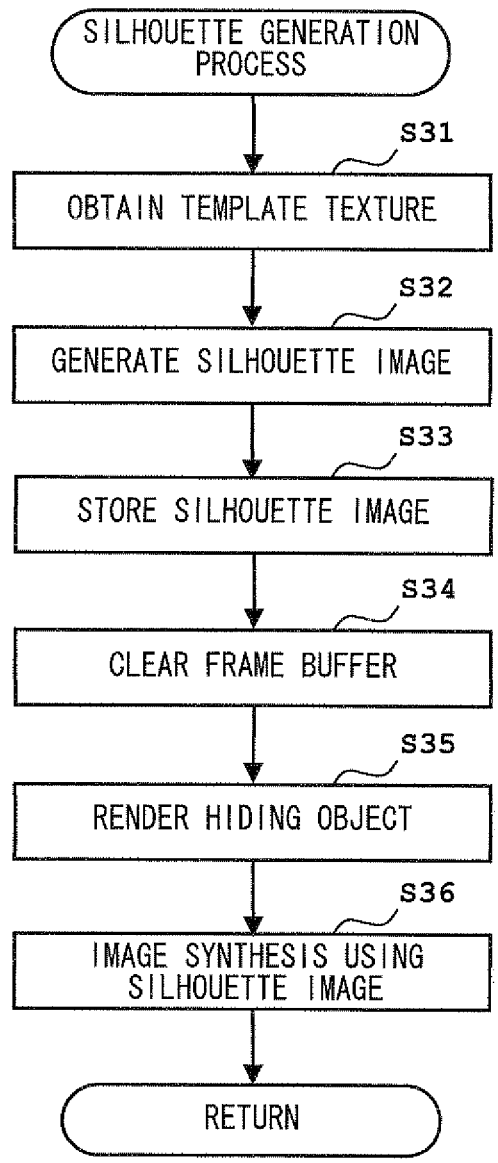
FIG. 12 is a flowchart showing a series of process steps concerning a silhouette generation process.

With reference to FIG. 12, the process will be described in detail. FIG. 12 is a flowchart showing a series of process steps concerning the silhouette generation process.

Figure 6C:
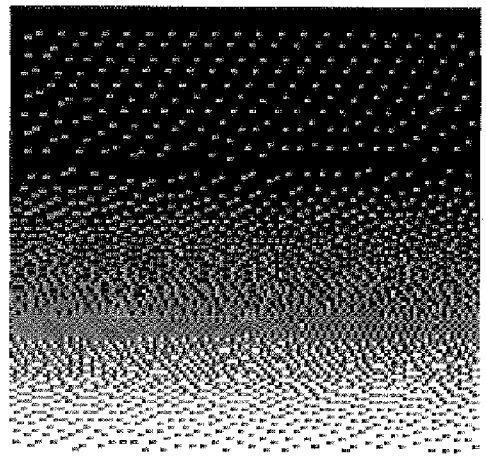
FIG. 6C schematically shows an example of a texture image D31.

At step 31, the processor (specifically, the GPU 32) obtains a texture image as a template texture for projection on a three-dimensional model. Specifically, the GPU 32 refers to the area for the template texture data D30 and obtains a texture image D31. The texture image D31 is, for example, a texture image to which a gradation is applied in a constant direction as shown in FIG. 6C. FIG. 6C schematically shows an example of the texture image D31 to which the gradation is applied in the constant direction, and a form of the gradation applied in the constant direction is not limited thereto.

At step 32, the processor (GPU 32) generates a silhouette image D51 of the object J1. Specifically, the GPU 32 performs mapping of the texture image D31 to the shape model of the object J1 using projection texture mapping, and renders a resultant image in the frame buffer 34a. In this case, the GPU 32 performs mapping so as to generate a gradation in which the color is the darkest at positions where the object J1 contacts the object 32 and the color is lighter at a position where the object J1 is more distant from the object J2.

An example of the technique for performing mapping of the texture image D31 to the shape model of the object J1 is the following technique.

As already described, the template texture image has a texture coordinate system for identifying parts of the image. In order to project the template texture image on the object 31, the GPU 32 calculates texture coordinates corresponding to vertexes that define the polygons of the object J1. In a method of calculating the texture coordinates, the coordinate (XYZ coordinate) of each vertex in a world space is transformed using a predetermined texture transform matrix.

Here, the GPU 32 has already obtained the coordinate, in the world space, of each vertex that constitutes the object J1, through the processing after step 1. In addition, for example, the above-described texture transform matrix is given by the inverse matrix of a view matrix in a direction in which the template texture image is projected on the object J1. Generally, the view matrix (viewing matrix) is defined by defining a position vector P of the viewpoint, a position vector E of a gazing point, and a vector U indicating an upward direction of the viewpoint. In the present embodiment, in such a view matrix, a direction vector in the world coordinate system, which indicates an upward direction of the object 32, can be obtained as the vector U; a direction vector in which a texture is projected can be obtained as the position vector P (it is only necessary that it is perpendicular to the vector U); and a position vector corresponding to a position where the object J1 contacts the object J2, can be obtained as the position vector E. Note that the upward direction of the object J2 is defined such that the surface of the object J2, on which the object J1 is present, is an upper surface.

Note that, even if an image used as the texture image D31 is only the texture image shown in FIG. 6C, when projecting the texture image D31 as a template texture on the object J1, the GPU 32 can shift a projecting position in a predetermined direction by setting offset or the like to the above-described vectors as appropriate. Similarly, the GPU 32 also can change the range of the texture to be projected, by setting a predetermined scale component to the matrix that is used when projection texture mapping is performed.

Moreover, when rendering a plurality of objects constituted of polygons, such that the objects overlap each other, the game apparatus body 5 uses depth information (e.g., stored in the Z buffer 34b) for setting priority of rendering of polygons along the depth direction.

At step 33, the processor (GPU 32) stores, as the silhouette image D51, the above-described image of the object J1 that is subjected to mapping with the texture having the gradation. Specifically, the GPU 32 obtains the silhouette image D51 (alpha texture) by writing the gradation information of the image of the object J1 into the alpha channel of the texture memory 32a. More specifically, when a value (A) of the alpha channel is defined to be in a range of $0.0 \le A \le 1.0$, the value (A) of the alpha channel for the silhouette image D51 can be set such that, in the image of the object J1 that is rendered in the frame buffer 34a at step 32, for a pixel corresponding to a darker area, the corresponding value (A) of the alpha channel for the silhouette image D51 is closer to 1.0, and, for a pixel corresponding to a lighter area, the corresponding value (A) of the alpha channel for the silhouette image D51 is closer to 0.0.

At step 34, the processor (GPU 32) clears the frame buffer 34a. At this time, the processor also clears the Z buffer 34b.

At step 35, the processor (GPU 32) renders, in the frame buffer 34a, the object J2 that is seen from the virtual camera VC. At this time, the processor performs rendering while enabling the Z buffer 34b, and the depth information is written into the Z buffer 34b. FIG. 8 shows an example of the image indicating the object J2, which is written into the frame buffer 34a at this time.

At step 36, the processor (GPU 32) synthesizes a certain color (a basic color of a silhouette) on the image of the object J2 rendered in the frame buffer 34a, on the basis of the information stored as the silhouette image D51 (in the alpha channel). Specifically, the GPU 32 mixes a certain color (e.g., a color, such as dark green, black, or the like, which is previously set as a basic color of a silhouette to be synthesized on the object J2) with the colors of the image of the object 32 at a mixture ratio corresponding to the gradation information held in the alpha channel for the silhouette image D51.

More specifically, the color of each pixel that is stored in the frame buffer 34a after update at step 36, is a color obtained by mixing the following colors: a color F of the image written into the frame buffer 34a at step 35; and the above certain color, at the mixture ratio corresponding to the gradation information held in the alpha channel for the silhouette image D51. An example of a more detailed procedure of the color synthesis is as follows.

Where the color stored in the frame buffer 34a after rendering the object 32 at step 35 is F; the value of the alpha channel for the silhouette image D51 that is stored at step 33 is A; and the above certain color is C, the color of each pixel after synthesis at step 36 is represented by the following formula.

$$(\text{Color after synthesis}) = F^*(1-A) + C^*A$$

In other words, at a part of the silhouette image D51 corresponding to a position where the object J1 contacts the object 52, the rate of C, which is the basic color of the silhouette, is high in the color after synthesis. At a part of the silhouette image D51 corresponding to a position where the object J1 is distant from the object J2, the rate of C, which is the basic color of the silhouette, is low in the color after synthesis.

Note that, in the above-described example, when the value (A) of the alpha channel is defined to be in a range of in a range of $0.0 \le A \le 1.0$, the value (A) of the alpha channel for the silhouette image D51 is set such that, in the image of the object J1 that is rendered in the frame buffer 34a at step 32, for a pixel corresponding to a darker area, the corresponding value (A) of the alpha channel for the silhouette image D51 is closer to 1.0, and, for a pixel corresponding to a lighter area, the corresponding value (A) of the alpha channel for the silhouette image D51 is closer to 0.0. This manner of setting A is not limited to this example. Alternatively, when the value (A) of the alpha channel is defined to be in a range of in a range of $0.0 \le A \le 1.0$, the value (A) of the alpha channel for the silhouette image D51 may be set such that, in the image of the object J1 that is rendered in the frame buffer 34a at step 32, for a pixel corresponding to a darker area, the corresponding value (A) of the alpha channel for the silhouette image D51 is closer to 0.0, and, for a pixel corresponding to a lighter area, the corresponding value (A) of the alpha channel for the silhouette image D51 is closer to 1.0. Note that, in this case, the color after synthesis at step 36 is represented by the following formula.

$$(\text{Color after synthesis}) = F^*A + C^*(1-A)$$

In other words, it is only necessary that, even when the alpha channel for the silhouette image D51 holds the gradation information in any form before obtaining the color after synthesis, in the color after synthesis, the rate of C, which is the basic color of the silhouette, is higher at a part of the silhouette image D51 corresponding to a position where the object J1 is closer to the object J2.

At step 36, after the processor performs image synthesis, the processor returns to the main flowchart shown in FIG. 11, and executes a process at step 4.

Specifically, at step 4, the processor enables a Z buffer, and renders the object J1 seen from the virtual camera VC, in the frame buffer 34a using a texture representing an original design of the object J1 (e.g., a yellow texture). Then, the processor displays the image rendered in the frame buffer 34a, on a screen (e.g., the monitor 2).

Incidentally, since the silhouette synthesis process at step 35 is performed on the entire image rendered in the frame buffer 34a at step 35, the silhouette is also synthesized and displayed on a part of a background that is seen through the opening of the object J2. However, this part is overwritten by rendering the object J1 at step 4, and thus no problem occurs.

Therefore, since the silhouette synthesis process at step 35 can be performed uniformly on the entire image stored in the frame buffer 34a, the silhouette synthesis process can be implemented by using a standard function of a general GPU without adding an exceptional process.

In this manner, the silhouette image of the hidden object that is darker at a part of the hidden object closer to the hiding object, can be synthesized and displayed on the hiding object. Thus, realistic expression is possible as compared to, for example, the case of synthesizing and displaying a solid silhouette.

Further, such a silhouette image can be generated by projection texture mapping using a texture having a gradation in a constant direction as described above. Thus, the silhouette image can be generated at a low processing load as compared to, for example, the case where the distance between a hiding object and a hidden object is calculated for each pixel for generating a silhouette image.

Moreover, projection texture mapping is a standard function of a general GPU. Thus, there is no need to add an exceptional process of calculating the distance between a hiding object and a hidden object for each pixel, and hence time and effort for programming are reduced.

(Modifications)

At step 36 in the above-described illustrative embodiment, when the color F in the image already written into the frame buffer 34a; and the certain color C for rendering the silhouette are synthesized, the processor (GPU 32) mixes the color F and the certain color C in accordance with the gradation information held in the alpha channel for the silhouette image D51, thereby synthesizing the silhouette on the image already written into the frame buffer 34a. However, any other synthesis technique may be used as long as the silhouette of the object J1 is visually recognized to be displayed in a semi-transparent manner so as to overlap the object J2. For example, a silhouette may be synthesized by a technique in which, for a color of an area to be displayed as a silhouette, the color F and the color C are displayed alternately every predetermined pixels (e.g., every pixel).

At step 33 in the above-described illustrative embodiment, the processor (GPU 32) obtains the silhouette image D51 by performing mapping of the template texture having the gradation in the constant direction, to the object J1. In another embodiment, a different form for obtaining the silhouette image D51 can be used. For example, the processor (GPU 32) may render the object J1 seen from the object J2 side while enabling the Z buffer 34b (color is not necessarily needed to be rendered in the frame buffer 34a), may transform the value (depth information) in the Z buffer 34b after the end of rendering, into a shade level of the image (e.g., transform the depth information into a shade level by using a predetermined transform function, and write the shade level into the alpha channel of the texture memory similarly to step 33), and may generate the silhouette image D51 that is darker at a position where the object J1 is closer to the object J2.

In the above-described illustrative embodiment, the case where a scene containing the object J1 and the object J2 is rendered, has been described. However, even in the case of containing three or more objects, the processor can similarly use the processing of the image display program D11.

For example, in the above-described illustrative embodiment, when it is assumed that, in addition to the object J1, another object J3 is located on the object 32, the processor first renders only the object J2 in the frame buffer 34a, and then mixes a certain color (e.g., black) with the image of the object J2 at a mixture ratio corresponding to a shade of each of two silhouette image corresponding to the objects J1 and J3. Then, the processor renders models of the objects J1 and J3 in the frame buffer 34a. Even when three or more objects are present as described above, it is understood that the processor may first render an object against which silhouettes are to be made, in the frame buffer 34a, then may synthesize silhouette images on the image rendered in the frame buffer 34a, at a mixture ratio corresponding to a shade of each silhouette image, and may finally render objects on which the silhouettes are based, in the frame buffer 34a.

Note that, in the above embodiment, the silhouette image D51 of the object J1 is generated on the basis of the model data D21 of the object J1. However, in other embodiments, silhouette model data used only for generating a silhouette image of the object J1 (e.g., model data representing a shape of the object J1 with polygons whose number is smaller than that in the model data D21 of the object J1) may be additionally prepared, and a silhouette image D1 of the object J1 may be generated using the silhouette model data. For example, when the silhouette image D1 is generated using the silhouette model data containing polygons whose number is smaller than that in the model data D21 of the object J1, the speed of the silhouette image generation process can be increased.

Note that, even when a first part of one continuous object is present at a position more distant from the virtual camera VC than a second part of the object and a part of the first part is hidden by the second part when seen from the virtual camera VC, a silhouette of the first part can be synthesized and displayed on the second part by: regarding the first part and the second part as the aforementioned hidden object and hiding object, respectively; and performing the same processing as in the above embodiment.

In the above-described illustrative embodiment, as an example, the case has been described where, in a state where sunlight is falling onto a green leaf and there is a four-legged yellow creature on the leaf, an image concerning a scene that is seen when the leaf is looked up at is rendered. However, rendering targets indicated herein, such as the four-legged yellow creature (the hidden object), the green leaf (the hiding object) onto which the sunlight is falling, and the like, are intended to be illustrative and not limited to this example. In other words, as long as a scene is rendered in which a silhouette of a hidden object appears on a surface of a hiding object with a certain effect, the technique in the above-described illustrative embodiment can be used for generating another scene.

For example, the technique is used for generating a scene in which a thick shoji (sliding paper door or screen) that does not allow light to entirely pass therethrough is present as a hiding object and a silhouette of a samurai as a hidden object is projected on a surface of the hiding object by light from a lantern.

Further, in the above embodiment, the ease has been described where the present invention is applied to the stationary game apparatus 3. However, the present invention is also applicable to any image display apparatus that executes the same image display processing as performed by the game apparatus 3. The present invention is also applicable to devices such as general personal computers, mobile phones, PDAs (Personal Digital Assistants), and hand-held game apparatuses.

In another embodiment, the image display program D11 may be executed in a form in which individual parts constituting the image display program D11 are executed on a plurality of computers concurrently and in parallel and the computers communicate with each other via a network (a distributed system).

Further, the above image display program D11 may be supplied to the game apparatus body 5 not only from an external storage medium such as the optical disc 4, but also via a wireless or wired communication line.

Moreover, the image display program D11 may be previously stored in a non-volatile storage device within the game apparatus body 5. Examples of the information storage medium having stored the image display program D11 thereon include any computer-readable storage media, e.g., CD-ROMs, DVDs, and any other optical disc-shaped storage media similar to these media, as well as non-volatile semiconductor memories.

Note that, in the above embodiment, the image display program D11 and the game application D12 are separately provided. However, this configuration is merely an example.

Thus, the image display program D11 may be incorporated into the game application D12.

Further, while maintaining the essence of the features of the image display program D11 exemplified in this specification, the functions provided to the user by the whole image display program D11 of the present invention can be reconfigured using constituent units of another program (e.g., modularization of predetermined functions can be utilized).

Recently, as a general trend, operating systems of typical computers are composed of various separate parts, called modules or functions; and offer a number of services via the separate parts. Further, in a commonly employed scheme, an application program calls such modules, if needed, for providing its service. In addition, software for general platforms is not always accompanied with such modules as a package; that is, it can be distributed without modules which are provided commonly in such platforms. Thus, software would be provided, which have been distributed without some modules or functions during the course of distribution thereof; and can offer a service which falls into the scope of the present invention, in connection with modules implemented in a computer executing the software. Such software can be distributed in various ways such as via computer network, in form of a storage medium having such software stored therein, and the like. Therefore, software or program deliberately provided in the above-mentioned manner, should be contemplated to fall into the scope of the above image display program.

While the invention has been described in detail, the foregoing description is in all aspects illustrative and not restrictive. It is to be understood that numerous other modifications and variations can be devised without departing from the scope of the invention. It is also to be understood that the scope of the invention is indicated by the appended claims rather than by the foregoing description. It is also to be understood that the detailed description herein enables one skilled in the art to make changes coming within the meaning and equivalency range of the present invention. It is also to be understood that all of the patents, patent applications and publications recited herein are hereby incorporated by reference as if set forth in their entirety herein. Furthermore, it should be understood throughout the present specification that expression of a singular form includes the concept of their plurality unless otherwise mentioned. Specifically, articles or adjectives for a singular form (e.g., "a", "an", "the", etc. in English) include the concept of their plurality unless otherwise mentioned. It should be also understood that the terms as used herein have definitions typically used in the art unless otherwise mentioned. Thus, unless otherwise defined, all scientific and technical terms have the same meanings as those generally used by those skilled in the art to which the present invention pertain. If there is contradiction, the present specification (including the definitions) precedes.

The present invention is suitable for, for example, a game apparatus that executes a game that progresses in a virtual three-dimensional game space.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium comprising an image display program that is executed by a computer of an image display apparatus that is configured to take an image of a virtual three-dimensional space in which a first object and a second object are present, by a virtual camera and render the virtual three-dimensional space, the image display program causing the computer to:
   generate a silhouette image for representing a silhouette of the first object when the first object overlaps at least a part of the second object and the overlapping portion of the first object is hidden by the second object when seen from the virtual camera, in which in the silhouette image, gradation information changes in accordance with a distance from the second object to each part of the first object, the silhouette image is textured independent of light from a light source in the virtual three-dimensional space;
   generate an image of the second object that is seen from the virtual camera; and
   synthesize the silhouette image on the image of the second object that is seen from the virtual camera by using the gradation information to shade the silhouette image darker at a portion thereof corresponding to a part of the first object closer to the second object, and lighter at a portion thereof corresponding to a part of the first object farther from the second object.

2. The non-transitory computer-readable storage medium according to claim 1, wherein the silhouette image is generated by performing mapping of a texture in which a gradation changes in tone in accordance with a distance from the second object, to the first object.

3. The non-transitory computer-readable storage medium according to claim 2, wherein the silhouette image is generated by projection texture mapping.

4. The non-transitory computer-readable storage medium according to claim 2, wherein the texture is a texture in which a gradation gradually changes from black to white.

5. The non-transitory computer-readable storage medium according to claim 1, wherein the silhouette image is generated on the basis of depth information of the first object that is seen from a second object side.

6. The non-transitory computer-readable storage medium according to claim 1, wherein the silhouette image is synthesized on the image of the second object that is seen from the virtual camera, by mixing, in accordance with the silhouette image, a color of the image of the second object and a certain color for representing the silhouette of the first object.

7. The non-transitory computer-readable storage medium according to claim 1, wherein a silhouette image is generated in which a color is darker at a portion thereof corresponding to a part of the first object closer to the second object.

8. The non-transitory computer-readable storage medium according to claim 7, wherein the silhouette image is synthesized on the image of the second object that is seen from the virtual camera, by alternately displaying the image of the second object and the silhouette image at intervals of a predetermined number of pixels.

9. The non-transitory computer-readable storage medium according to claim 1, wherein the image display program further causes the computer to overwrite an image of a portion of the first object that is not hidden by the second object when seen from the virtual camera, at a position, in an image after synthesis, corresponding to the portion.

10. The non-transitory computer-readable storage medium according to claim 9, wherein
   the image of the second object is generated while generating depth information from the virtual camera,
   the silhouette image is synthesized on the image of the second object without updating the generated depth information, on the basis of the depth information, a portion of the first object that is not hidden by the second object is determined, and on the basis of a determination result, an image of the portion of the first object that is not hidden by the second object is overwritten, at a position, in the image after synthesis, corresponding to the portion.

11. The non-transitory computer-readable storage medium according to claim 9, wherein the image display program further causes the computer to update a position or a posture of the first object in the virtual three-dimensional space, and the updating process, the generating processes, the synthesizing process, and the overwriting process, are repeatedly executed as a series of processes.

12. The non-transitory computer-readable storage medium according to claim 1, wherein the overlapping portion of the first object is hidden when the second object is positioned between the first object and the virtual camera.

13. The non-transitory computer-readable storage medium according to claim 1, wherein the overlapping portion of the first object is hidden when the second object is positioned between the first object and a viewing direction of the virtual camera.

14. The non-transitory computer-readable storage medium according to claim 1, wherein synthesizing the silhouette image includes generating a texture image and mapping the texture image to generate a gradation in which a color is darkest at positions where the first object contacts the second object, and the color is lightest at positions where the first object is distant from the second object.

15. An image display apparatus configured to take an image of a virtual three-dimensional space in which a first object and a second object are present, by a virtual camera and render the virtual three-dimensional space, the image display apparatus comprising at least one processor, the at least one processor controlling the apparatus to:

generate, when the first object overlaps at least a part of the second object and the overlapping portion of the first object is hidden by the second object when seen from the virtual camera, a silhouette image for representing a silhouette of the first object, in which in the silhouette image, gradation information changes in accordance with a distance from the second object to each part of the first object, the silhouette image is textured independent of light from a light source in the virtual three-dimensional space;

generate an image of the second object that is seen from the virtual camera; and synthesize the silhouette image on the image of the second object that is seen from the virtual camera by using the gradation information to shade the silhouette image darker at a portion thereof corresponding to a part of the first object closer to the second object, and lighter at a portion thereof corresponding to a part of the first object farther from the second object.

16. The image display apparatus according to claim 15, wherein the overlapping portion of the first object is hidden when the second object is positioned between the first object and the virtual camera.

17. An image display system configured to take an image of a virtual three-dimensional space in which a first object and a second object are present, by a virtual camera and render the virtual three-dimensional space, the image display system comprising:

a processing system having at least one processor, the processing system configured to:

generate a silhouette image for representing a silhouette of the first object when the first object overlaps at least a part of the second object and the overlapping portion of the first object is hidden by the second object when seen from the virtual camera, in which in the silhouette image, gradation information changes in accordance with a distance from the second object to each part of the first object, the silhouette image is textured independent of light from a light source in the virtual three-dimensional space, generate an image of the second object that is seen from the virtual camera, and synthesize the silhouette image on the image of the second object that is seen from the virtual camera by using the gradation information to shade the silhouette image darker at a portion thereof corresponding to a part of the first object closer to the second object, and lighter at a portion thereof corresponding to a part of the first object farther from the second object.

18. The image display system according to claim 17, wherein the overlapping portion of the first object is hidden when the second object is positioned between the first object and the virtual camera.

19. An image display method for taking an image of a virtual three-dimensional space in which a first object and a second object are present, by a virtual camera and rendering the virtual three-dimensional space, the image display method comprising:

generating a silhouette image for representing a silhouette of the first object when the first object overlaps at least a part of the second object and the overlapping portion of the first object is hidden by the second object when seen from the virtual camera, in which in the silhouette image, gradation information changes in accordance with a distance from the second object to each part of the first object, the silhouette image is textured independent of light from a light source in the virtual three-dimensional space;

generating an image of the second object that is seen from the virtual camera; and synthesizing the silhouette image on the image of the second object that is seen from the virtual camera by using the gradation information to shade the silhouette image darker at a portion thereof corresponding to a part of the first object closer to the second object, and lighter at a portion thereof corresponding to a part of the first object farther from the second object.

20. The image display method according to claim 19, wherein the overlapping portion of the first object is hidden when the second object is positioned between the first object and the virtual camera.

* * * * *